(12) United States Patent
Fuller et al.

(10) Patent No.: US 11,558,538 B2
(45) Date of Patent: Jan. 17, 2023

(54) PORTABLE CAMERA SYSTEM

(71) Applicant: OPKIX, INC., Costa Mesa, CA (US)

(72) Inventors: Ryan Mikah Fuller, Costa Mesa, CA (US); Tamio Lucien Stehrenberger, Laguna Nigel, CA (US); Shahin Amirpour, Huntington Beach, CA (US); John McGuiness, Huntington Beach, CA (US); C Lawrence Greaves, Huntington Beach, CA (US)

(73) Assignee: OPKIX, INC., Costa Mesa, CA (US)

( * ) Notice: Subject to any disclaimer, the term of this patent is extended or adjusted under 35 U.S.C. 154(b) by 234 days.

(21) Appl. No.: 15/455,196

(22) Filed: Mar. 10, 2017

(65) Prior Publication Data

US 2017/0272640 A1    Sep. 21, 2017

Related U.S. Application Data

(60) Provisional application No. 62/310,135, filed on Mar. 18, 2016.

(51) Int. Cl.
*H04N 5/232* (2006.01)

(52) U.S. Cl.
CPC .............................. *H04N 5/23203* (2013.01)

(58) Field of Classification Search
None
See application file for complete search history.

(56) References Cited

U.S. PATENT DOCUMENTS

| | | |
|---|---|---|
| 3,476,467 A | 11/1969 | Curry |
| 3,593,449 A | 7/1971 | Nielson |
| 3,780,918 A | 12/1973 | Curtis |
| 4,298,913 A | 11/1981 | Lozar et al. |
| 4,351,086 A | 9/1982 | Drlik |
| 4,379,988 A | 4/1983 | Mattatall |
| 4,405,213 A | 9/1983 | Kolkmann |
| 4,457,461 A | 7/1984 | Docking et al. |
| 4,506,961 A | 3/1985 | Palmieri |
| 4,516,157 A | 5/1985 | Campbell |
| 4,529,633 A | 7/1985 | Karlsson et al. |

(Continued)

FOREIGN PATENT DOCUMENTS

| | | |
|---|---|---|
| CA | 154079 S | 12/2014 |
| CN | 1117593 A | 2/1996 |
| CN | 1916754 B | 2/2007 |
| CN | 200972550 Y | 11/2007 |
| CN | 101529899 A | 9/2009 |
| CN | 201318005 | 9/2009 |
| CN | 101605169 A | 12/2009 |

(Continued)

OTHER PUBLICATIONS

Potensic Digital Endoscope Borescope Review, Johny TechReview, Aug. 5, 2015, https://www.youtube.com/watch?v=y_Gw_sc2dh8.*

(Continued)

*Primary Examiner* — James M Hannett
(74) *Attorney, Agent, or Firm* — Knobbe, Martens, Olson & Bear, LLP (57) ABSTRACT

An operationally dependent external camera system for use with a portable computer device. The system includes a portable computer device, a camera, and an operation cord. The camera may include a lens, image sensor, circuit board, microphone, and control unit. The operation cord is coupled between the camera and the portable computer device to continuously transmit both data and electrical power between the portable computer device and the camera thereby making the camera operationally dependent on the portable computer device.

8 Claims, 4 Drawing Sheets

(56) References Cited

U.S. PATENT DOCUMENTS

| | | |
|---|---|---|
| 4,781,315 A | 11/1988 | Nordskog |
| 4,791,963 A | 12/1988 | Gronert |
| 4,816,031 A | 3/1989 | Pfoff |
| 4,845,755 A | 7/1989 | Busch et al. |
| 4,918,737 A | 4/1990 | Luethi |
| 5,079,629 A | 1/1992 | Oz |
| 5,181,051 A | 1/1993 | Townsend et al. |
| D354,505 S | 1/1995 | Francavilla |
| 5,416,537 A | 5/1995 | Sadler |
| 5,568,207 A | 10/1996 | Chao |
| 5,598,846 A | 2/1997 | Peszynski |
| 5,606,743 A | 2/1997 | Vogt et al. |
| 5,608,808 A | 3/1997 | Da Silva |
| 5,623,703 A | 4/1997 | Takagi et al. |
| 5,636,775 A | 6/1997 | Kartsotis et al. |
| D385,290 S | 10/1997 | Totsuka et al. |
| 5,786,789 A | 7/1998 | Janky |
| 5,815,126 A | 9/1998 | Fan et al. |
| 5,913,815 A | 6/1999 | Ball et al. |
| 5,915,588 A | 6/1999 | Stoken et al. |
| 6,020,920 A | 2/2000 | Anderson |
| 6,028,413 A | 2/2000 | Brockmann |
| 6,076,927 A | 6/2000 | Owens |
| 6,091,546 A | 7/2000 | Spitzer |
| 6,115,482 A | 9/2000 | Sears et al. |
| 6,120,146 A | 9/2000 | Harris |
| 6,157,291 A | 12/2000 | Kuenster et al. |
| 6,174,058 B1 | 1/2001 | Hsiao |
| 6,206,543 B1 | 3/2001 | Henry |
| 6,209,830 B1 | 4/2001 | Brotz |
| 6,215,460 B1 | 4/2001 | Mizoguchi et al. |
| 6,275,681 B1 | 8/2001 | Vega et al. |
| 6,282,302 B1 | 8/2001 | Hara |
| 6,317,039 B1 | 11/2001 | Thomason et al. |
| 6,467,929 B2 | 10/2002 | Lee |
| 6,604,837 B2 | 8/2003 | Sandberg et al. |
| 6,657,673 B2 | 12/2003 | Ishikawa et al. |
| 6,697,117 B1 | 2/2004 | Park |
| 6,704,044 B1 | 3/2004 | Foster et al. |
| 6,711,744 B1 | 3/2004 | Hockenbury |
| 6,717,737 B1 | 4/2004 | Haglund et al. |
| 6,733,150 B1 | 5/2004 | Hanley et al. |
| 6,735,897 B1 | 5/2004 | Schmitter |
| 6,783,238 B1 | 8/2004 | Stepper |
| 6,809,358 B2 | 10/2004 | Hsieh et al. |
| 6,819,354 B1 | 11/2004 | Foster et al. |
| 6,933,981 B1 | 8/2005 | Kishida et al. |
| 6,977,479 B2 | 12/2005 | Hsu |
| 7,003,353 B1 | 2/2006 | Parkhouse |
| 7,043,041 B2 | 5/2006 | Hacek et al. |
| 7,092,763 B1 | 8/2006 | Griffith et al. |
| 7,126,558 B1 | 10/2006 | Dempski |
| 7,129,986 B2 | 10/2006 | Wang |
| D531,656 S | 11/2006 | Della |
| 7,158,096 B1 | 1/2007 | Spitzer |
| 7,163,309 B2 | 1/2007 | Sohn et al. |
| 7,172,283 B1 | 2/2007 | Asta |
| 7,203,134 B1 | 4/2007 | Jackson |
| 7,229,168 B2 | 6/2007 | Kidouchim |
| 7,236,356 B2 | 6/2007 | Ulla et al. |
| 7,320,514 B2 | 1/2008 | Smith |
| D563,454 S | 3/2008 | Miklitarian |
| 7,409,234 B2 | 8/2008 | Glezerman |
| 7,435,019 B2 | 10/2008 | Lee |
| 7,597,440 B1 | 10/2009 | Magal |
| 7,618,260 B2 | 11/2009 | Daniel et al. |
| 7,656,439 B1 | 2/2010 | Manico et al. |
| 7,684,868 B2 | 3/2010 | Tai et al. |
| 7,793,361 B2 | 9/2010 | Ishihara et al. |
| 7,937,880 B1 | 5/2011 | Fidlow |
| 7,979,963 B2 | 7/2011 | Lee-Holowka et al. |
| D643,867 S | 8/2011 | Boland |
| 7,988,283 B2 | 8/2011 | Jannard |
| 8,011,783 B1 | 9/2011 | Leblang |
| 8,046,948 B2 | 11/2011 | Mauch et al. |
| 8,063,934 B2 | 11/2011 | Donato et al. |
| 8,068,169 B2 | 11/2011 | Chang |
| D650,411 S | 12/2011 | Fuchs |
| 8,077,029 B1 | 12/2011 | Daniel et al. |
| D653,202 S | 1/2012 | Hasbrook et al. |
| 8,109,629 B2 | 2/2012 | Howell et al. |
| 8,111,042 B2 | 2/2012 | Bennett |
| 8,123,352 B2 | 2/2012 | Matsumoto et al. |
| D659,094 S | 5/2012 | Brand et al. |
| 8,175,660 B2 | 5/2012 | Porwal |
| 8,193,781 B2 | 6/2012 | Lin et al. |
| 8,228,299 B1 | 7/2012 | Maloney et al. |
| D666,144 S | 8/2012 | Brand et al. |
| 8,299,877 B2 | 10/2012 | Hong et al. |
| D670,703 S | 11/2012 | Hasbrook et al. |
| D671,493 S | 11/2012 | Hasbrook et al. |
| 8,334,620 B2 | 12/2012 | Park et al. |
| D675,625 S | 2/2013 | Hasbrook et al. |
| D675,668 S | 2/2013 | Johnson et al. |
| D676,432 S | 2/2013 | Hasbrook et al. |
| 8,367,235 B2 | 2/2013 | Huang |
| 8,378,524 B2 | 2/2013 | Mita |
| 8,401,595 B2 | 3/2013 | Zhu et al. |
| 8,432,129 B2 | 4/2013 | Lee et al. |
| D682,914 S | 5/2013 | Fuchs |
| 8,461,983 B2 | 6/2013 | McCauley et al. |
| 8,469,508 B2 | 6/2013 | Silver et al. |
| 8,473,004 B2 | 6/2013 | Warren |
| 8,493,287 B2 | 7/2013 | Yamamoto |
| 8,519,834 B2 | 8/2013 | Jersa et al. |
| 8,534,514 B2 | 9/2013 | Zhu et al. |
| 8,541,975 B2 | 9/2013 | Park et al. |
| 8,571,609 B2 | 10/2013 | Hwang et al. |
| 8,587,241 B2 | 11/2013 | Maeda |
| 8,593,570 B2 | 11/2013 | Boland |
| 8,653,909 B2 | 2/2014 | Park et al. |
| 8,670,027 B1 | 3/2014 | Schaffer |
| D702,202 S | 4/2014 | Fisher |
| D704,765 S | 5/2014 | Markovitz et al. |
| 8,716,899 B2 | 5/2014 | Yi et al. |
| 8,754,548 B2 | 6/2014 | Hong et al. |
| 8,778,022 B2 | 7/2014 | Blum et al. |
| 8,787,970 B2 | 7/2014 | Warren |
| 8,817,395 B2 | 8/2014 | Wu |
| D712,452 S | 9/2014 | Fuchs |
| 8,823,215 B2 | 9/2014 | Park et al. |
| 8,829,724 B2 | 9/2014 | Ryu et al. |
| 8,830,888 B2 | 9/2014 | Shin et al. |
| 8,842,635 B2 | 9/2014 | Kim et al. |
| 8,847,930 B2 | 9/2014 | Boyd et al. |
| 8,868,140 B2 | 10/2014 | Zhu et al. |
| 8,890,954 B2 | 11/2014 | O'Donnell et al. |
| 8,896,694 B2 | 11/2014 | O'Donnell et al. |
| 8,915,588 B2 | 12/2014 | Blum et al. |
| 8,918,919 B2 | 12/2014 | Scholz |
| 8,922,161 B2 | 12/2014 | Choi et al. |
| D720,800 S | 1/2015 | Shin |
| 8,927,881 B2 | 1/2015 | Wittenberg et al. |
| 8,929,245 B2 | 1/2015 | Sivanesan et al. |
| 8,931,896 B2 | 1/2015 | Blum et al. |
| 8,934,045 B2 | 1/2015 | Karn et al. |
| 8,953,827 B2 | 2/2015 | Sacha et al. |
| 8,957,629 B2 | 2/2015 | Ryu et al. |
| 8,970,689 B2 | 3/2015 | Campbell et al. |
| 8,971,039 B2 | 3/2015 | Huang et al. |
| 8,987,942 B2 | 3/2015 | Kim et al. |
| D726,140 S | 4/2015 | Park et al. |
| D729,650 S | 5/2015 | Phillips et al. |
| 9,024,484 B2 | 5/2015 | Park et al. |
| 9,026,165 B2 | 5/2015 | Kim et al. |
| 9,030,052 B2 | 5/2015 | Kim et al. |
| 9,031,610 B2 | 5/2015 | Kulas |
| 9,048,682 B2 | 6/2015 | Lee et al. |
| 9,048,683 B2 | 6/2015 | Lee et al. |
| 9,048,695 B2 | 6/2015 | Hwang et al. |
| 9,065,488 B2 | 6/2015 | Kim et al. |
| 9,075,249 B2 | 7/2015 | Heinrich et al. |
| 9,088,167 B2 | 7/2015 | Kim et al. |
| 9,088,171 B2 | 7/2015 | Won et al. |

(56) References Cited

U.S. PATENT DOCUMENTS

| | | |
|---|---|---|
| D737,889 S | 9/2015 | Yoo |
| 9,122,083 B2 | 9/2015 | Blum et al. |
| 9,124,796 B2 | 9/2015 | Blum |
| D741,943 S | 10/2015 | Keplinger |
| 9,152,130 B2 | 10/2015 | Pattikonda et al. |
| D742,372 S | 11/2015 | Christopher et al. |
| D743,477 S | 11/2015 | Strecker |
| D743,479 S | 11/2015 | Keplinger |
| 9,185,278 B2 | 11/2015 | Waters |
| D745,922 S | 12/2015 | Shen |
| D746,358 S | 12/2015 | Markovitz et al. |
| D755,787 S | 5/2016 | Zander et al. |
| 9,344,816 B2 | 5/2016 | Larsen et al. |
| 9,380,374 B2 | 6/2016 | Sprague et al. |
| 9,386,832 B2 | 7/2016 | Elgan |
| D763,951 S | 8/2016 | Chae |
| D765,765 S | 9/2016 | Clegg |
| D766,770 S | 9/2016 | Devaney et al. |
| D767,013 S | 9/2016 | Hsu |
| D767,014 S | 9/2016 | Fuchs |
| 9,461,501 B2 | 10/2016 | Partovi et al. |
| D772,330 S | 11/2016 | Hsu |
| 9,609,902 B2 | 4/2017 | Waters |
| 9,612,506 B1 | 4/2017 | Webb et al. |
| 9,628,707 B2 | 4/2017 | Blum |
| 9,635,222 B2 | 4/2017 | Blum |
| D787,582 S | 5/2017 | Desodt et al. |
| 9,781,327 B2 * | 10/2017 | Nakamura ......... H04N 5/23203 |
| 9,823,494 B2 | 11/2017 | Blum et al. |
| 9,930,257 B2 | 3/2018 | Blum et al. |
| 10,185,163 B2 | 1/2019 | Blum et al. |
| 10,218,884 B2 | 2/2019 | Longbotham et al. |
| 10,241,351 B2 | 3/2019 | Blum et al. |
| 10,348,965 B2 | 7/2019 | Blum et al. |
| 10,419,648 B2 | 9/2019 | Fuller et al. |
| 10,481,471 B2 | 11/2019 | Zeng |
| 10,620,459 B2 | 4/2020 | Blum et al. |
| 10,863,060 B2 | 12/2020 | Kokonaski et al. |
| 10,887,516 B2 | 1/2021 | Blum et al. |
| 2001/0026684 A1 | 10/2001 | Sorek et al. |
| 2001/0041073 A1 | 11/2001 | Sorek et al. |
| 2002/0118279 A1 | 8/2002 | Spoonhower et al. |
| 2002/0170147 A1 | 11/2002 | Heller |
| 2003/0016284 A1 | 1/2003 | Squilla et al. |
| 2003/0044180 A1 | 3/2003 | Lindberg |
| 2003/0053608 A1 | 3/2003 | Ohmae et al. |
| 2003/0122958 A1 | 7/2003 | Olita et al. |
| 2003/0128274 A1 | 7/2003 | Dunn |
| 2003/0174242 A1 * | 9/2003 | Carmi ................ H04N 1/00127 348/376 |
| 2003/0206099 A1 | 11/2003 | Richman et al. |
| 2004/0008157 A1 | 1/2004 | Brubaker et al. |
| 2004/0013279 A1 | 1/2004 | Takeda et al. |
| 2004/0033058 A1 | 2/2004 | Reich |
| 2004/0080299 A1 | 4/2004 | Forster et al. |
| 2004/0088051 A1 | 5/2004 | Seligman |
| 2004/0200868 A1 | 10/2004 | Woodman |
| 2004/0221370 A1 | 11/2004 | Hannula et al. |
| 2004/0262342 A1 | 12/2004 | Pringle |
| 2005/0046786 A1 | 3/2005 | Smith |
| 2005/0083579 A1 | 4/2005 | Volkenandt et al. |
| 2005/0088811 A1 | 4/2005 | Ulla et al. |
| 2005/0096084 A1 | 5/2005 | Pohja et al. |
| 2005/0167558 A1 | 8/2005 | Smith |
| 2005/0201584 A1 | 9/2005 | Smith et al. |
| 2005/0225443 A1 | 10/2005 | Lerg et al. |
| 2005/0248717 A1 | 11/2005 | Howell et al. |
| 2006/0004546 A1 | 1/2006 | Slanec |
| 2006/0008257 A1 | 1/2006 | Mahashin et al. |
| 2006/0023158 A1 | 2/2006 | Howell et al. |
| 2006/0034478 A1 | 2/2006 | Davenport |
| 2006/0038917 A1 | 2/2006 | Funato et al. |
| 2006/0048286 A1 | 3/2006 | Donato et al. |
| 2006/0055786 A1 | 3/2006 | Ollila |
| 2006/0082730 A1 | 4/2006 | Franks |
| 2006/0095128 A1 | 5/2006 | Blum et al. |
| 2006/0121639 A1 | 6/2006 | Tai et al. |
| 2006/0121950 A1 | 6/2006 | Lee et al. |
| 2006/0215013 A1 | 9/2006 | Jongsma et al. |
| 2006/0215393 A1 | 9/2006 | VanderSchuit et al. |
| 2006/0248251 A1 | 11/2006 | Tracy et al. |
| 2006/0268217 A1 | 11/2006 | Teng |
| 2007/0009253 A1 | 1/2007 | Nikkanen et al. |
| 2007/0013864 A1 | 1/2007 | Dietz |
| 2007/0023496 A1 | 2/2007 | Hall |
| 2007/0030442 A1 | 2/2007 | Howell et al. |
| 2007/0109768 A1 | 5/2007 | Sohn et al. |
| 2007/0153639 A1 | 7/2007 | Lafever |
| 2007/0159810 A1 | 7/2007 | Kim et al. |
| 2007/0201861 A1 | 8/2007 | Coulman et al. |
| 2007/0291165 A1 | 12/2007 | Wang |
| 2008/0001735 A1 | 1/2008 | Tran et al. |
| 2008/0034637 A1 | 2/2008 | Summers |
| 2008/0088791 A1 | 4/2008 | Smith |
| 2008/0107414 A1 | 5/2008 | Showalter et al. |
| 2008/0116847 A1 | 5/2008 | Loke et al. |
| 2008/0117328 A1 | 5/2008 | Daoud et al. |
| 2008/0137589 A1 | 6/2008 | Barrett et al. |
| 2008/0137890 A1 | 6/2008 | Petersen et al. |
| 2008/0163536 A1 | 7/2008 | Koch et al. |
| 2008/0180537 A1 | 7/2008 | Weinberg et al. |
| 2008/0183028 A1 | 7/2008 | Guillen et al. |
| 2008/0192114 A1 | 8/2008 | Pearson et al. |
| 2008/0208335 A1 | 8/2008 | Blum et al. |
| 2008/0231721 A1 | 9/2008 | Chou et al. |
| 2008/0239232 A1 | 10/2008 | Guerrero |
| 2008/0259269 A1 | 10/2008 | Grogan et al. |
| 2008/0301846 A1 | 12/2008 | Brillouet |
| 2009/0009410 A1 | 1/2009 | Dolgin et al. |
| 2009/0031069 A1 | 1/2009 | Habuto et al. |
| 2009/0038056 A1 | 2/2009 | Bobbin et al. |
| 2009/0040308 A1 | 2/2009 | Temovskiy |
| 2009/0110386 A1 | 4/2009 | Kamada et al. |
| 2009/0169120 A1 | 7/2009 | Otani |
| 2009/0173760 A1 | 7/2009 | Good |
| 2009/0189981 A1 | 7/2009 | Siann et al. |
| 2009/0207701 A1 | 8/2009 | Jacques |
| 2009/0243397 A1 | 10/2009 | Cook et al. |
| 2009/0251661 A1 | 10/2009 | Fuziak, Jr. |
| 2009/0262205 A1 | 10/2009 | Smith |
| 2009/0264966 A1 | 10/2009 | Blum et al. |
| 2009/0271243 A1 | 10/2009 | Shell et al. |
| 2009/0273755 A1 | 11/2009 | Laventure |
| 2009/0307828 A1 | 12/2009 | Ludlow |
| 2009/0322512 A1 | 12/2009 | Fredrick et al. |
| 2010/0017578 A1 | 1/2010 | Mansson et al. |
| 2010/0036773 A1 | 2/2010 | Bennett |
| 2010/0045114 A1 | 2/2010 | Sample et al. |
| 2010/0053555 A1 | 3/2010 | Enriquez et al. |
| 2010/0073262 A1 | 3/2010 | Matsumoto |
| 2010/0073478 A1 | 3/2010 | Kalous |
| 2010/0077334 A1 | 3/2010 | Yang et al. |
| 2010/0103076 A1 | 4/2010 | Yamamoto |
| 2010/0157432 A1 | 6/2010 | Sugihara et al. |
| 2010/0164295 A1 | 7/2010 | Ichikawa et al. |
| 2010/0174629 A1 | 7/2010 | Taylor et al. |
| 2010/0177476 A1 | 7/2010 | Hotelling et al. |
| 2010/0187910 A1 | 7/2010 | Brengauz |
| 2010/0198009 A1 | 8/2010 | Farr et al. |
| 2010/0214767 A1 | 8/2010 | Waters et al. |
| 2010/0245585 A1 | 9/2010 | Fisher et al. |
| 2010/0245757 A1 | 9/2010 | Sugihara et al. |
| 2010/0264872 A1 | 10/2010 | Kwong |
| 2010/0265655 A1 | 10/2010 | Metzler et al. |
| 2010/0284683 A1 | 11/2010 | Fressola et al. |
| 2010/0287683 A1 | 11/2010 | Neal |
| 2010/0287685 A1 | 11/2010 | Peterson et al. |
| 2010/0313335 A1 | 12/2010 | Waters et al. |
| 2010/0319096 A1 | 12/2010 | Scott et al. |
| 2011/0074349 A1 | 3/2011 | Ghovanloo |
| 2011/0085032 A1 | 4/2011 | Kim |
| 2011/0085041 A1 | 4/2011 | Kildevaeld |
| 2011/0115429 A1 | 5/2011 | Toivola et al. |
| 2011/0121042 A1 | 5/2011 | Weiss |

(56) References Cited

U.S. PATENT DOCUMENTS

| | | |
|---|---|---|
| 2011/0156639 A1 | 6/2011 | Ryu et al. |
| 2011/0181238 A1 | 7/2011 | Soar |
| 2011/0184320 A1 | 7/2011 | Shipps et al. |
| 2011/0185538 A1 | 8/2011 | Hotellier et al. |
| 2011/0188677 A1 | 8/2011 | Rothkopf et al. |
| 2011/0193963 A1 | 8/2011 | Hess et al. |
| 2011/0221389 A1 | 9/2011 | Won et al. |
| 2011/0221390 A1 | 9/2011 | Won et al. |
| 2011/0222154 A1 | 9/2011 | Choi et al. |
| 2011/0225073 A1 | 9/2011 | Won et al. |
| 2011/0234012 A1 | 9/2011 | Yi et al. |
| 2011/0241438 A1 | 10/2011 | Kim et al. |
| 2011/0241612 A1 | 10/2011 | Ryu et al. |
| 2011/0261176 A1 | 10/2011 | Monaghan, Sr. et al. |
| 2012/0032631 A1 | 2/2012 | Bourilkov et al. |
| 2012/0050607 A1 | 3/2012 | Sims et al. |
| 2012/0062173 A1 | 3/2012 | Choi et al. |
| 2012/0066351 A1 | 3/2012 | Choi et al. |
| 2012/0075571 A1 | 3/2012 | Silver |
| 2012/0077437 A1 | 3/2012 | Agevik et al. |
| 2012/0081658 A1 | 4/2012 | Sugihara et al. |
| 2012/0105740 A1 | 5/2012 | Jannard et al. |
| 2012/0127423 A1 | 5/2012 | Blum et al. |
| 2012/0130252 A1 | 5/2012 | Pohjanen et al. |
| 2012/0146575 A1 | 6/2012 | Armstrong et al. |
| 2012/0153903 A1 | 6/2012 | Kim et al. |
| 2012/0164943 A1 | 6/2012 | Bennett |
| 2012/0169272 A1 | 7/2012 | Khalepari |
| 2012/0169278 A1 | 7/2012 | Choi et al. |
| 2012/0189146 A1 | 7/2012 | Wuidart |
| 2012/0193996 A1 | 8/2012 | Ryu et al. |
| 2012/0194419 A1 | 8/2012 | Osterhout et al. |
| 2012/0212593 A1 | 8/2012 | Na'Aman et al. |
| 2012/0274680 A1 | 11/2012 | Hofman |
| 2012/0280575 A1 | 11/2012 | Kim et al. |
| 2012/0281961 A1 | 11/2012 | Forbes |
| 2012/0286581 A1 | 11/2012 | Ryu et al. |
| 2012/0286582 A1 | 11/2012 | Kim et al. |
| 2012/0286726 A1 | 11/2012 | Kim et al. |
| 2012/0293008 A1 | 11/2012 | Park et al. |
| 2012/0293009 A1 | 11/2012 | Kim et al. |
| 2012/0293010 A1 | 11/2012 | Lee et al. |
| 2012/0294478 A1 | 11/2012 | Publicover et al. |
| 2012/0299390 A1 | 11/2012 | Kim et al. |
| 2012/0300872 A1 | 11/2012 | Kim et al. |
| 2012/0306269 A1 | 12/2012 | Kim et al. |
| 2012/0306284 A1 | 12/2012 | Lee et al. |
| 2012/0307229 A1 | 12/2012 | Conroy et al. |
| 2012/0309304 A1 | 12/2012 | Kim et al. |
| 2012/0309305 A1 | 12/2012 | Kim et al. |
| 2012/0309306 A1 | 12/2012 | Kim et al. |
| 2012/0309308 A1 | 12/2012 | Kim et al. |
| 2012/0313445 A1 | 12/2012 | Park et al. |
| 2012/0313447 A1 | 12/2012 | Park et al. |
| 2012/0328043 A1 | 12/2012 | Kwon et al. |
| 2012/0329405 A1 | 12/2012 | Lee et al. |
| 2013/0015813 A1 | 1/2013 | Kim et al. |
| 2013/0026847 A1 | 1/2013 | Kim et al. |
| 2013/0033117 A1 | 2/2013 | Kim et al. |
| 2013/0033610 A1 | 2/2013 | Osborn et al. |
| 2013/0035034 A1 | 2/2013 | Kim et al. |
| 2013/0039395 A1 | 2/2013 | Norconk et al. |
| 2013/0043734 A1 | 2/2013 | Stone et al. |
| 2013/0043737 A1 | 2/2013 | Yeo et al. |
| 2013/0044257 A1 | 2/2013 | Chien et al. |
| 2013/0047317 A1 | 2/2013 | Hanover et al. |
| 2013/0049456 A1 | 2/2013 | Kim et al. |
| 2013/0049483 A1 | 2/2013 | Kim et al. |
| 2013/0057079 A1 | 3/2013 | Park et al. |
| 2013/0058379 A1 | 3/2013 | Kim et al. |
| 2013/0058380 A1 | 3/2013 | Kim et al. |
| 2013/0059533 A1 | 3/2013 | Kwon et al. |
| 2013/0062963 A1 | 3/2013 | Chemokalov et al. |
| 2013/0062964 A1 | 3/2013 | Chemokalov et al. |
| 2013/0062965 A1 | 3/2013 | Chemokalov et al. |
| 2013/0063082 A1 | 3/2013 | Lee et al. |
| 2013/0063083 A1 | 3/2013 | Park et al. |
| 2013/0063873 A1 | 3/2013 | Wodrich et al. |
| 2013/0082651 A1 | 4/2013 | Park et al. |
| 2013/0093255 A1 | 4/2013 | Jung et al. |
| 2013/0096382 A1* | 4/2013 | Alexander ......... A61B 1/00016 600/110 |
| 2013/0099588 A1 | 4/2013 | Yeo et al. |
| 2013/0099591 A1 | 4/2013 | Yeo et al. |
| 2013/0099732 A1 | 4/2013 | Lee et al. |
| 2013/0099733 A1 | 4/2013 | Park et al. |
| 2013/0099734 A1 | 4/2013 | Lee et al. |
| 2013/0101133 A1 | 4/2013 | Yoon et al. |
| 2013/0113296 A1 | 5/2013 | Ryu et al. |
| 2013/0113298 A1 | 5/2013 | Ryu et al. |
| 2013/0119780 A1 | 5/2013 | Kim et al. |
| 2013/0119929 A1 | 5/2013 | Partovi |
| 2013/0120596 A1 | 5/2013 | Yau |
| 2013/0127410 A1 | 5/2013 | Park et al. |
| 2013/0128364 A1 | 5/2013 | Wheeler et al. |
| 2013/0130621 A1 | 5/2013 | Kim et al. |
| 2013/0134791 A1 | 5/2013 | Park et al. |
| 2013/0134927 A1 | 5/2013 | Park et al. |
| 2013/0147427 A1 | 6/2013 | Polu et al. |
| 2013/0148271 A1 | 6/2013 | Huang |
| 2013/0154387 A1 | 6/2013 | Lee et al. |
| 2013/0154557 A1 | 6/2013 | Lee et al. |
| 2013/0154558 A1 | 6/2013 | Lee et al. |
| 2013/0162200 A1 | 6/2013 | Terry et al. |
| 2013/0163090 A1 | 6/2013 | Yu et al. |
| 2013/0174205 A1 | 7/2013 | Jacobsen et al. |
| 2013/0176626 A1 | 7/2013 | Heinrich et al. |
| 2013/0176652 A1 | 7/2013 | Kim et al. |
| 2013/0176653 A1 | 7/2013 | Kim et al. |
| 2013/0181665 A1 | 7/2013 | Lee et al. |
| 2013/0182002 A1 | 7/2013 | Macciola et al. |
| 2013/0187475 A1 | 7/2013 | Vendik et al. |
| 2013/0187598 A1 | 7/2013 | Park et al. |
| 2013/0200844 A1 | 8/2013 | Lee et al. |
| 2013/0201162 A1 | 8/2013 | Cavilia |
| 2013/0201299 A1 | 8/2013 | Waters et al. |
| 2013/0201440 A1 | 8/2013 | Howell et al. |
| 2013/0207479 A1 | 8/2013 | Vendik et al. |
| 2013/0207851 A1 | 8/2013 | Dabov |
| 2013/0210378 A1 | 8/2013 | Zhu et al. |
| 2013/0214734 A1 | 8/2013 | Kang et al. |
| 2013/0214735 A1 | 8/2013 | Kang et al. |
| 2013/0215374 A1 | 8/2013 | Blum et al. |
| 2013/0216085 A1 | 8/2013 | Honeycutt |
| 2013/0221912 A1 | 8/2013 | Kang et al. |
| 2013/0221914 A1 | 8/2013 | Kim et al. |
| 2013/0221915 A1 | 8/2013 | Son et al. |
| 2013/0225082 A1 | 8/2013 | Kang et al. |
| 2013/0229614 A1 | 9/2013 | Marini et al. |
| 2013/0235226 A1 | 9/2013 | Karn et al. |
| 2013/0235234 A1 | 9/2013 | Cucci et al. |
| 2013/0235332 A1 | 9/2013 | Blum et al. |
| 2013/0240579 A1 | 9/2013 | Yu |
| 2013/0241308 A1 | 9/2013 | Bilbrey et al. |
| 2013/0249306 A1 | 9/2013 | Kim et al. |
| 2013/0250135 A1 | 9/2013 | Blum et al. |
| 2013/0250232 A1 | 9/2013 | Belbey et al. |
| 2013/0252669 A1 | 9/2013 | Nhiayi |
| 2013/0264997 A1 | 10/2013 | Lee et al. |
| 2013/0270920 A1 | 10/2013 | Yoon et al. |
| 2013/0278072 A1 | 10/2013 | Yoon et al. |
| 2013/0278207 A1 | 10/2013 | Yoo |
| 2013/0282117 A1 | 10/2013 | Van Heugten et al. |
| 2013/0286226 A1 | 10/2013 | Baum et al. |
| 2013/0300204 A1 | 11/2013 | Partovi |
| 2013/0320736 A1 | 12/2013 | Teufel et al. |
| 2013/0322753 A1 | 12/2013 | Lim et al. |
| 2013/0329183 A1 | 12/2013 | Blum et al. |
| 2013/0343585 A1 | 12/2013 | Bennett et al. |
| 2014/0009627 A1 | 1/2014 | Tanaka et al. |
| 2014/0021796 A1 | 1/2014 | Song et al. |
| 2014/0022765 A1 | 1/2014 | Waters |
| 2014/0027521 A1 | 1/2014 | Pedicano et al. |

(56) References Cited

U.S. PATENT DOCUMENTS

| | | |
|---|---|---|
| 2014/0036127 A1* | 2/2014 | Pong .................. H04R 1/028 348/333.01 |
| 2014/0042824 A1 | 2/2014 | Fells et al. |
| 2014/0043580 A1 | 2/2014 | Steele |
| 2014/0044281 A1 | 2/2014 | Ganem et al. |
| 2014/0049211 A1 | 2/2014 | Park et al. |
| 2014/0049636 A1 | 2/2014 | O'Donnell et al. |
| 2014/0053318 A1 | 2/2014 | Fitzgerald et al. |
| 2014/0058506 A1 | 2/2014 | Tai et al. |
| 2014/0062395 A1 | 3/2014 | Kwon |
| 2014/0070623 A1 | 3/2014 | Keeling et al. |
| 2014/0070624 A1 | 3/2014 | Kim et al. |
| 2014/0070625 A1 | 3/2014 | Kim et al. |
| 2014/0071644 A1 | 3/2014 | Yoon et al. |
| 2014/0077613 A1 | 3/2014 | Song et al. |
| 2014/0077614 A1 | 3/2014 | Park et al. |
| 2014/0084688 A1 | 3/2014 | Tzanidi et al. |
| 2014/0084858 A1 | 3/2014 | Kim et al. |
| 2014/0103873 A1 | 4/2014 | Partovi et al. |
| 2014/0111018 A1 | 4/2014 | Kwon et al. |
| 2014/0111153 A1 | 4/2014 | Kwon et al. |
| 2014/0113689 A1 | 4/2014 | Lee |
| 2014/0125278 A1 | 5/2014 | Kim et al. |
| 2014/0135592 A1 | 5/2014 | Ohnemus et al. |
| 2014/0139180 A1 | 5/2014 | Kim et al. |
| 2014/0139637 A1 | 5/2014 | Mistry et al. |
| 2014/0146282 A1 | 5/2014 | Lu |
| 2014/0152116 A1 | 6/2014 | Kim et al. |
| 2014/0152516 A1 | 6/2014 | Kim et al. |
| 2014/0152576 A1 | 6/2014 | Kim |
| 2014/0153760 A1 | 6/2014 | Newton et al. |
| 2014/0159503 A1 | 6/2014 | Murakami et al. |
| 2014/0159654 A1 | 6/2014 | Lee et al. |
| 2014/0159894 A1 | 6/2014 | Tropper et al. |
| 2014/0183967 A1 | 7/2014 | Ryu et al. |
| 2014/0191593 A1 | 7/2014 | Moh |
| 2014/0197785 A1 | 7/2014 | Lee et al. |
| 2014/0203657 A1 | 7/2014 | Song et al. |
| 2014/0204235 A1 | 7/2014 | Wexler et al. |
| 2014/0223462 A1 | 8/2014 | Aimone et al. |
| 2014/0232980 A1 | 8/2014 | Harms et al. |
| 2014/0239280 A1 | 8/2014 | Takada |
| 2014/0241555 A1 | 8/2014 | Terlizzi |
| 2014/0252875 A1 | 9/2014 | Lee |
| 2014/0253028 A1 | 9/2014 | Lee et al. |
| 2014/0253322 A1 | 9/2014 | Chapin |
| 2014/0265614 A1 | 9/2014 | Kim et al. |
| 2014/0265615 A1 | 9/2014 | Kim et al. |
| 2014/0266020 A1 | 9/2014 | Van Lammeren et al. |
| 2014/0266988 A1 | 9/2014 | Fisher et al. |
| 2014/0267596 A1 | 9/2014 | Geerds |
| 2014/0267874 A1 | 9/2014 | Ratcliff et al. |
| 2014/0268008 A1 | 9/2014 | Howell et al. |
| 2014/0268017 A1 | 9/2014 | Sweis et al. |
| 2014/0270685 A1 | 9/2014 | Letke et al. |
| 2014/0270688 A1 | 9/2014 | Han et al. |
| 2014/0285139 A1 | 9/2014 | Ahn et al. |
| 2014/0285141 A1 | 9/2014 | Lee et al. |
| 2014/0285142 A1 | 9/2014 | Lee et al. |
| 2014/0285416 A1 | 9/2014 | Priyantha et al. |
| 2014/0295918 A1 | 10/2014 | Grifoni et al. |
| 2014/0300809 A1 | 10/2014 | Oliveira |
| 2014/0301727 A1 | 10/2014 | Resh |
| 2014/0304891 A1 | 10/2014 | Waters et al. |
| 2014/0307902 A1 | 10/2014 | Ku et al. |
| 2014/0308987 A1 | 10/2014 | Wilson et al. |
| 2014/0312834 A1 | 10/2014 | Tanabe et al. |
| 2014/0313471 A1 | 10/2014 | Eubanks |
| 2014/0319927 A1 | 10/2014 | Cho et al. |
| 2014/0327319 A1 | 11/2014 | Byun et al. |
| 2014/0327393 A1 | 11/2014 | Lee et al. |
| 2014/0327409 A1 | 11/2014 | Lee et al. |
| 2014/0327756 A1 | 11/2014 | Huang et al. |
| 2014/0340033 A1 | 11/2014 | Kim et al. |
| 2014/0345090 A1 | 11/2014 | Wang |
| 2014/0346888 A1 | 11/2014 | Kim et al. |
| 2014/0347006 A1 | 11/2014 | Kim et al. |
| 2014/0352033 A1 | 12/2014 | Bryan et al. |
| 2014/0354880 A1 | 12/2014 | Han |
| 2014/0361736 A1 | 12/2014 | Kwon et al. |
| 2014/0361738 A1 | 12/2014 | Lee et al. |
| 2014/0361881 A1 | 12/2014 | Gillem et al. |
| 2014/0375246 A1 | 12/2014 | Boysen, III et al. |
| 2014/0375256 A1 | 12/2014 | Lee et al. |
| 2015/0009309 A1 | 1/2015 | Heinrich et al. |
| 2015/0009312 A1 | 1/2015 | Verna |
| 2015/0035991 A1 | 2/2015 | Sachs et al. |
| 2015/0036003 A1 | 2/2015 | Sakurai et al. |
| 2015/0046418 A1 | 2/2015 | Akbacak et al. |
| 2015/0049001 A1 | 2/2015 | Rahman et al. |
| 2015/0049201 A1 | 2/2015 | Liu et al. |
| 2015/0060506 A1 | 3/2015 | Cameron et al. |
| 2015/0061589 A1 | 3/2015 | Wodrich et al. |
| 2015/0070596 A1 | 3/2015 | Gadjali |
| 2015/0076297 A1 | 3/2015 | Parrill |
| 2015/0086175 A1 | 3/2015 | Lorenzetti |
| 2015/0091389 A1 | 4/2015 | Bryne et al. |
| 2015/0102995 A1 | 4/2015 | Shen et al. |
| 2015/0103158 A1 | 4/2015 | Cornelius |
| 2015/0103304 A1 | 4/2015 | Darcy |
| 2015/0130935 A1 | 5/2015 | Siann |
| 2015/0137746 A1 | 5/2015 | Lee et al. |
| 2015/0141752 A1 | 5/2015 | Wilson et al. |
| 2015/0148599 A1 | 5/2015 | Wilson et al. |
| 2015/0010286 A1 | 6/2015 | Asanuma et al. |
| 2015/0168729 A1 | 6/2015 | Kobayashi |
| 2015/0173497 A1 | 6/2015 | Yu |
| 2015/0180286 A1 | 6/2015 | Asanuma et al. |
| 2015/0193949 A1 | 7/2015 | Katz et al. |
| 2015/0193980 A1 | 7/2015 | Pedley |
| 2015/0204949 A1 | 7/2015 | Von Novak, III |
| 2015/0234201 A1 | 8/2015 | Levesque |
| 2015/0236521 A1 | 8/2015 | Park et al. |
| 2015/0241916 A1 | 8/2015 | Choi et al. |
| 2015/0244204 A1 | 8/2015 | Lee et al. |
| 2015/0244341 A1 | 8/2015 | Ritter et al. |
| 2015/0244427 A1 | 8/2015 | Kim et al. |
| 2015/0244910 A1 | 8/2015 | Marston et al. |
| 2015/0249361 A1 | 9/2015 | Kim et al. |
| 2015/0249916 A1 | 9/2015 | Schlub et al. |
| 2015/0261013 A1 | 9/2015 | Dobson et al. |
| 2015/0304555 A1 | 10/2015 | Ehrenkranz |
| 2015/0323858 A1 | 11/2015 | Stephens et al. |
| 2015/0326748 A1 | 11/2015 | Tisch et al. |
| 2015/0334258 A1* | 11/2015 | O'Neill .................. H04N 5/2257 348/207.1 |
| 2015/0355481 A1 | 12/2015 | Hilkes et al. |
| 2016/0004057 A1 | 1/2016 | Lin et al. |
| 2016/0025996 A1 | 1/2016 | Bacon |
| 2016/0026156 A1 | 1/2016 | Jackson et al. |
| 2016/0026240 A1 | 1/2016 | Wexler et al. |
| 2016/0026853 A1 | 1/2016 | Wexler |
| 2016/0033792 A1 | 2/2016 | Blum et al. |
| 2016/0037025 A1 | 2/2016 | Blum |
| 2016/0048160 A1 | 2/2016 | Haddick |
| 2016/0054645 A1 | 2/2016 | Contino et al. |
| 2016/0066656 A1 | 3/2016 | Ferris |
| 2016/0072296 A1 | 3/2016 | Nejatali et al. |
| 2016/0104284 A1 | 4/2016 | Maguire et al. |
| 2016/0104451 A1 | 4/2016 | Sahin |
| 2016/0119520 A1 | 4/2016 | Park |
| 2016/0125656 A1 | 5/2016 | James et al. |
| 2016/0131963 A1 | 5/2016 | Clearman |
| 2016/0154239 A9 | 6/2016 | Layson, Jr. |
| 2016/0158082 A1 | 6/2016 | Gainer et al. |
| 2016/0172870 A1 | 6/2016 | Blum et al. |
| 2016/0174669 A1 | 6/2016 | Ferris |
| 2016/0182826 A1 | 6/2016 | Blum et al. |
| 2016/0190859 A1 | 6/2016 | Blum et al. |
| 2016/0195798 A1 | 7/2016 | Nenov |
| 2016/0203359 A1 | 7/2016 | von Und Zu Liechtenstein |
| 2016/0206056 A1 | 7/2016 | Pluemer et al. |
| 2016/0223886 A1 | 8/2016 | Bellerive et al. |
| 2016/0225191 A1 | 8/2016 | Mullins |

(56) References Cited

U.S. PATENT DOCUMENTS

| | | | |
|---|---|---|---|
| 2016/0261147 A1 | 9/2016 | Blum et al. |
| 2016/0273703 A1 | 9/2016 | Li |
| 2016/0277649 A1 | 9/2016 | Katz et al. |
| 2016/0294225 A1 | 10/2016 | Blum et al. |
| 2016/0349533 A1 | 12/2016 | Grassi |
| 2016/0360161 A1 | 12/2016 | Fitzgerald |
| 2016/0363787 A1 | 12/2016 | Blum et al. |
| 2017/0006201 A1* | 1/2017 | Segura ................. H04N 7/22 |
| 2017/0006225 A1 | 1/2017 | Fu |
| 2017/0010698 A1 | 1/2017 | Ibragimova et al. |
| 2017/0055072 A1* | 2/2017 | Kim ................. H04N 1/2112 |
| 2017/0024612 A1 | 3/2017 | Sood et al. |
| 2017/0069192 A1 | 3/2017 | Sood et al. |
| 2017/0127196 A1 | 5/2017 | Blum et al. |
| 2017/0134645 A1 | 5/2017 | Kim et al. |
| 2017/0146894 A1 | 5/2017 | Kubotera et al. |
| 2017/0150049 A1 | 5/2017 | Blum et al. |
| 2017/0163840 A1* | 6/2017 | Ito ................. H04N 5/225 |
| 2017/0195529 A1 | 7/2017 | Blum |
| 2017/0216099 A1 | 8/2017 | Saladino |
| 2017/0223236 A1 | 8/2017 | Oberlander et al. |
| 2017/0250722 A1 | 8/2017 | Lee et al. |
| 2017/0285754 A1 | 10/2017 | Holman et al. |
| 2017/0329365 A1 | 11/2017 | Wong et al. |
| 2017/0349116 A1 | 12/2017 | Liao |
| 2017/0363885 A1 | 12/2017 | Blum et al. |
| 2017/0370522 A1 | 12/2017 | Schield |
| 2018/0020193 A1 | 1/2018 | Blum et al. |
| 2018/0042369 A1 | 2/2018 | Blum et al. |
| 2018/0063433 A1 | 3/2018 | Blum et al. |
| 2018/0088355 A1 | 3/2018 | Blum et al. |
| 2018/0103195 A1* | 4/2018 | Kim ................. H04N 5/23216 |
| 2018/0115691 A1 | 4/2018 | Blum et al. |
| 2018/0116384 A1 | 5/2018 | Blum et al. |
| 2018/0129078 A1 | 5/2018 | Blum et al. |
| 2018/0131847 A1 | 5/2018 | Kokonaski et al. |
| 2018/0143458 A1 | 5/2018 | Blum et al. |
| 2018/0249078 A1 | 8/2018 | Blum et al. |
| 2018/0249079 A1 | 8/2018 | Blum et al. |
| 2018/0249094 A1 | 8/2018 | Fuller et al. |
| 2018/0262055 A1 | 9/2018 | Schoenbart et al. |
| 2018/0295264 A1 | 10/2018 | Fuller et al. |
| 2018/0295328 A1 | 10/2018 | Tucker |
| 2019/0235356 A1 | 8/2019 | Fuller et al. |
| 2019/0258061 A1 | 8/2019 | Solomon |
| 2019/0313025 A1 | 10/2019 | Blum et al. |
| 2020/0041822 A1 | 2/2020 | Blum et al. |
| 2020/0285134 A1 | 9/2020 | Greaves et al. |
| 2020/0329177 A1 | 10/2020 | Greaves et al. |

FOREIGN PATENT DOCUMENTS

| | | |
|---|---|---|
| CN | 202033546 U | 11/2011 |
| CN | 202043207 U | 11/2011 |
| CN | 202153283 U | 2/2012 |
| CN | 202407553 | 9/2012 |
| CN | 202419070 | 9/2012 |
| CN | 202424276 | 9/2012 |
| CN | 202424277 | 9/2012 |
| CN | 202424278 | 9/2012 |
| CN | 202424279 | 9/2012 |
| CN | 202424807 | 9/2012 |
| CN | 102777487 | 11/2012 |
| CN | 202635909 | 1/2013 |
| CN | 202635910 | 1/2013 |
| CN | 202635911 | 1/2013 |
| CN | 202636015 | 1/2013 |
| CN | 202647093 | 1/2013 |
| CN | 202647094 | 1/2013 |
| CN | 202647101 | 1/2013 |
| CN | 202647104 | 1/2013 |
| CN | 202647111 | 1/2013 |
| CN | 202649874 | 1/2013 |
| CN | 202649875 | 1/2013 |
| CN | 202651825 | 1/2013 |
| CN | 202652281 | 1/2013 |
| CN | 202652282 | 1/2013 |
| CN | 202652304 | 1/2013 |
| CN | 202652305 | 1/2013 |
| CN | 202800463 | 3/2013 |
| CN | 202800547 | 3/2013 |
| CN | 202811809 | 3/2013 |
| CN | 202818399 | 3/2013 |
| CN | 103036282 A | 4/2013 |
| CN | 202904151 U | 4/2013 |
| CN | 103167176 A | 6/2013 |
| CN | 203104584 U | 7/2013 |
| CN | 203178585 | 9/2013 |
| CN | 203416299 U | 1/2014 |
| CN | 203590323 U | 5/2014 |
| CN | 203708487 U | 7/2014 |
| CN | 104273891 A | 1/2015 |
| CN | 204420521 U | 6/2015 |
| CN | 204481892 U | 7/2015 |
| CN | 204498235 | 7/2015 |
| CN | 206115346 U | 4/2017 |
| CN | 106817455 A | 6/2017 |
| DE | 202009015991 | 4/2010 |
| EP | 0736268 | 10/1996 |
| GB | 2472120 A | 1/2011 |
| JP | 07099596 A | 4/1995 |
| JP | H08505238 A | 6/1996 |
| JP | 2000138858 A | 5/2000 |
| JP | 4006856 B2 | 11/2007 |
| JP | 2008067285 A | 3/2008 |
| JP | 3150547 U | 4/2009 |
| JP | 2012063641 A | 3/2012 |
| JP | 2017013087 A | 1/2017 |
| JP | 2017013088 A | 1/2017 |
| JP | 2017013089 A | 1/2017 |
| JP | 2017013090 A | 1/2017 |
| JP | 2017013091 A | 1/2017 |
| JP | 2017013092 A | 1/2017 |
| JP | 2017120333 A2 | 7/2017 |
| KR | 1020090047255 A | 5/2009 |
| KR | 1020140053341 A | 5/2014 |
| KR | 101421046 B1 | 7/2014 |
| KR | 1020140091195 A | 7/2014 |
| KR | 20150071892 | 6/2015 |
| KR | 101646541 | 8/2016 |
| TW | M300818 U | 11/2006 |
| TW | 200843277 A | 11/2008 |
| TW | 201036430 A | 10/2010 |
| TW | M395176 U | 12/2010 |
| TW | 201145748 A1 | 12/2011 |
| TW | 201415753 A | 4/2014 |
| TW | 1020140091195 A | 7/2014 |
| TW | 201520976 A | 6/2015 |
| TW | 201610506 A | 3/2016 |
| WO | WO 9208157 A1 | 5/1992 |
| WO | WO 199926411 A1 | 5/1999 |
| WO | WO 0106298 A1 | 1/2001 |
| WO | WO 0245044 A1 | 6/2002 |
| WO | WO 2009018391 A1 | 2/2009 |
| WO | WO 2009052705 A1 | 4/2009 |
| WO | WO 2010137495 A1 | 12/2010 |
| WO | WO 2012/039738 A1 | 3/2012 |
| WO | WO 2013/118162 A1 | 8/2013 |
| WO | WO 2013118162 A1 | 8/2013 |
| WO | WO 2013172532 A1 | 11/2013 |
| WO | WO 2014/012451 A1 | 1/2014 |
| WO | WO 2014/012536 A1 | 1/2014 |
| WO | WO 2014109515 A1 | 7/2014 |

OTHER PUBLICATIONS

6 LED 7mm Lens IP67 1M USB Endoscope for Android Smartphone and PC, Tinydeal DV+, Jan. 19, 2016, https://www.youtube.com/watch?v=XAWAgtMgU50.*

* cited by examiner

PORTABLE CAMERA SYSTEM

RELATED APPLICATIONS

This application claims priority to U.S. provisional application Ser. No. 62/310,135 filed Mar. 18, 2016, the contents of which are incorporated by reference.

FIELD OF THE INVENTION

The invention generally relates to portable camera systems. In particular, the present invention relates to a portable camera system configured to operate in conjunction with a portable computer device system.

BACKGROUND OF THE INVENTION

Portable computing devices (PCD) such as smartphones, tablet phones, tablets, etc. have become ubiquitous among industrialized populations. PCDs are characterized by independent communication and computer processing. For example, PCDs include a radio capable of communicating wirelessly over one or more data frequencies (i.e. cellular, Bluetooth, WiFi). PCDs further include computer components which enable the PCD to function independently of other computing devices, including processors, power sources, memory modules, etc.

PCDs include a variety of input components, including cameras, touch screen, biometric sensors, connectors, microphones, etc., which enable a user to input data into the PCD via various media. For example, a user may input video or photo data via an integrated camera within the PCD. The PCD may then process and display the video or photo data on an output component such as a display screen. The processing of data may include selective manipulation via various applications, or apps.

Conventional PCD-based camera components are limited in their operation and utility. Most PCDs include one or more integrated photo and/or video camera component. However, the integrated camera components are inherently restricted to a location on the PCD device. Therefore, in order to both capture an image and view the real-time input of the photo/video component on the display screen of the PCD, a user is inherently limited in positioning and orienting the photo/video component. Likewise, video capture over a period of time is cumbersome because it requires a user to physically position the entire PCD in a manner so as to capture the desired video view angle.

External camera components such as GO PRO® type devices provide convenient positioning but then require cumbersome data transfer to one or more computing devices. Many external components transfer data onto digital media that cannot be directly transferred into a PCD without additional components (i.e. SD Cards). Likewise, external camera components require independent computer accessories such as power sources, processors, memory modules, user activation/controls, etc. in order to operate.

Therefore, there is a need in the industry for a portable camera system that integrates with a portable computing device to provide optimum positioning and efficient operation.

SUMMARY OF THE INVENTION

The present invention relates to portable camera systems. One embodiment of the present invention relates to an operationally dependent external camera system for use with a portable computer device. The system includes a portable computer device, a camera, and an operation cord. The camera may include a lens, image sensor, circuit board, microphone, and control unit. The operation cord is coupled between the camera member and the portable computer device to continuously transmit both data and electrical power between the portable computer device and the camera, thereby making the camera operationally dependent on the portable computer device. A second embodiment of the present invention relates to a method of controlling an operationally dependent camera system with a portable computer device. A third embodiment relates to a physical modular connection system enabling selective coupling of the camera to a user during operation. A fourth embodiment of the present invention relates to a portable computer device application which enables intuitive operation of the camera system, including functions for editing, viewing, sharing, etc.

Embodiments of the present invention represent a significant advance in the field of portable camera devices. Conventional portable cameras are generally either internal/integrated and dependent on a portable computer device or external and independent of a portable computer device. Internal dependent camera systems are inefficient at recording video or taking photos because they require a user to position and maintain the entire portable computer device at a particular viewing angle. Likewise, external independent camera systems are inefficient because they are cumbersome physically and operationally. External independent cameras are physically cumbersome in that they incorporate a power source, a processor, user controls, display, storage modules, etc. Likewise, external independent cameras are operationally dependent because they require some form of data transfer to a portable computer device for editing, sharing, long term storage, etc. Embodiments of the present invention incorporate the novel concept of making the camera external to the portable computer device yet operationally dependent via an operation cord. The novel combination of these concepts enables the camera to have the small form factor and convenience of an internal/integrated camera with the improved viewing angles of an external camera.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to portable camera systems. One embodiment of the present invention relates to an operationally dependent external camera system for use with a portable computer device. The system includes a portable computer device, a camera, and an operation cord. The camera may include a lens, image sensor, circuit board, microphone, and control unit. The operation cord is coupled between the camera member and the portable computer device to continuously transmit both data and electrical power between the portable computer device and the camera, thereby making the camera operationally dependent on the portable computer device. A second embodiment of the present invention relates to a method of controlling an operationally dependent camera system with a portable computer device. A third embodiment relates to a physical modular connection system enabling selective coupling of the camera to a user during operation. A fourth embodiment of the present invention relates to a portable computer device application which enables intuitive operation of the camera system including functions for editing, viewing, sharing, etc. Also, while embodiments are described in reference to a visual camera system, it will be appreciated that the teachings of the present invention are applicable to other areas including but not limited to other camera and sensing systems such as audio, position, infrared, microscopic, etc.

Figure 1:
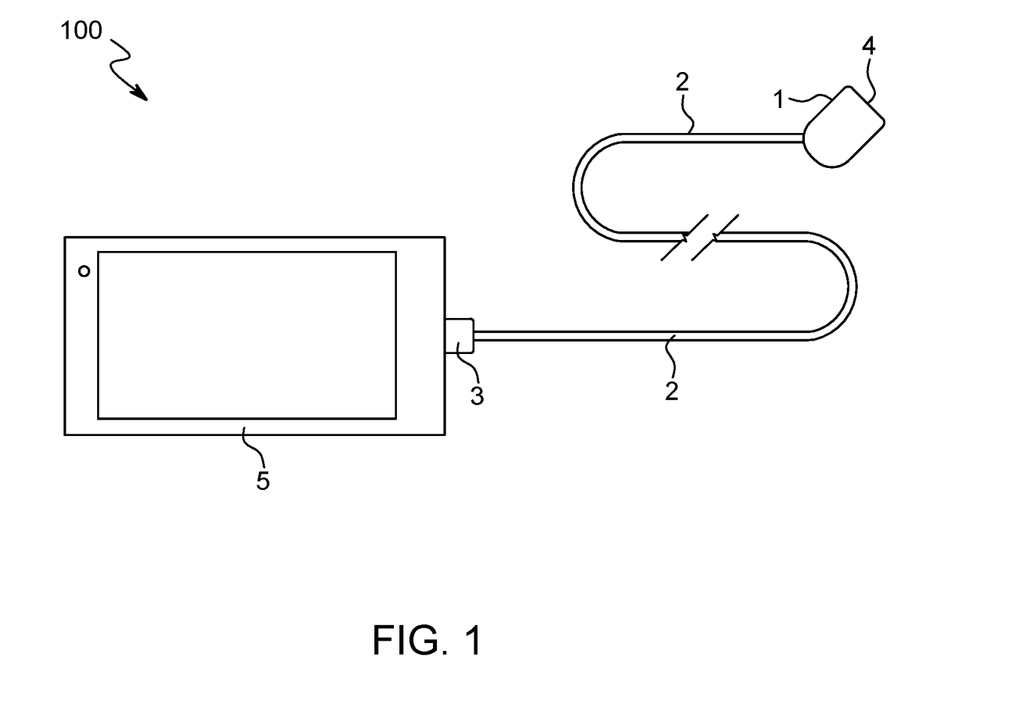
FIG. 1 illustrates a schematic view of an operationally dependent external camera system in accordance with embodiments of the present invention.

Reference is initially made to FIG. 1, which illustrates a schematic view of an operationally dependent external camera system, designated generally at 100. The illustrated system 100 embodiment includes a portable computer device (PCD) 5, a PCD connector 3, an operation cord 2, a camera 1, and a lens 4. A PCD is defined as any type of small portable computing device that includes integrated wireless data transfer functionalities, a power source, a display screen, and at least one user input device. In addition, a PCD is defined as having an external form factor smaller than twenty cubic inches. Examples of a PCD include but are not limited to a smartphone, mini-computer, e-reader, tablet, or tablet phone. The camera 1 is an external unit having a form factor smaller than three cubic inches. The camera 1 is physically connected to the PCD 5 via the operation cord 2 via the PCD connector 3. Although the camera 1 is external to the PCD 5, it is operationally dependent on the PCD 5. The camera 1 does not include a power source or storage module. Rather, the camera 1 relies on the PCD for both power, storage, and image processing of data, thereby creating the novel operational dependence yet external location. Various intuitive user operational features may be incorporated within the operational relationship of the camera 1 and PCD 5. For example, the camera 1 may be configured to automatically record video upon connecting to the PCD 5. Alternatively, the camera 1 may include one or more user inputs which may enable a user to activate the camera 1. The operation cord 2 may optionally be configured to visually indicate if the camera is recording via a fiber optic illumination. The PCD connector 3 may be any type of connector including but not limited to APPLE lightning, USB, etc.

Although not illustrated it will be appreciated that the PCD 5 may include a specific application configured to operate with the camera 1. The application may include various photo and video features such as editing, storing, sharing, etc. The application may also interface with other apps to enable seamless social media sharing or cloud storage. The application may receive various user inputs on the PCD 5 that are converted into instructions transmitted to the camera 1. The instructions may affect one or more variable functions of the camera such as audio, video resolution, position data, recording status, etc.

The system 100 may further include user attachment systems that enable selective retention of the camera 1 on specific locations of a user (i.e. on a hat, shirt, gloves, sunglasses, etc). The user attachment system may specifically include one or more modular clips or clasps that permit secure attachment to a user-selected location.

Figure 2:
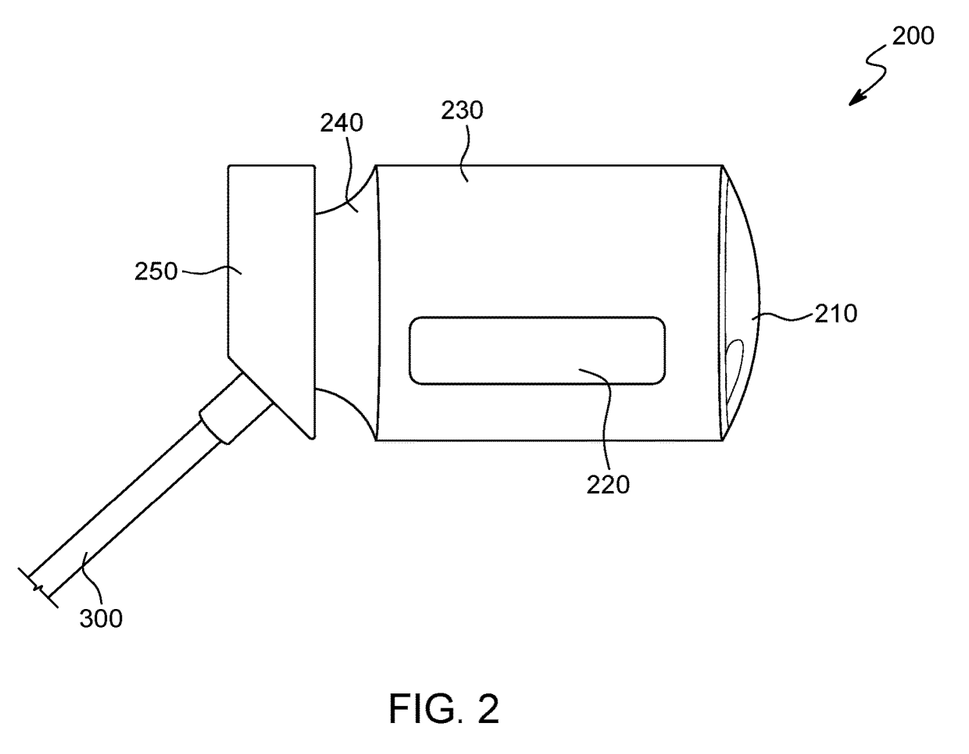
FIG. 2 illustrates a detailed perspective view of a camera in accordance with embodiments of the present invention.

Reference is next made to FIG. 2, which illustrates a detailed perspective view of a camera, designated generally at 200. The camera 200 includes a lens 210, detent 220, body 230, recess 240, rear housing 250, and operation cord 300. The camera 200 further includes internal components such as a detector and printed circuit board electrically coupled with an operation cord 300. The illustrated camera 200 is substantially cylindrical, but it will be appreciated that other shapes may be implemented in accordance with alternative embodiments. The external shape of the illustrated embodiment camera 200 is less than three cubic inches. The lens 210 is positioned on a distal end to facilitate a particular field of view of at maximum 180 degrees. The detent 210 is a recess within the body 230 which may facilitate one or more coupling schemes. The body 230 is a substantially cylindrical region with the lens 210 on one lengthwise side opposite the operation cord 300. The recess 240 is disposed between the body 230 and the rear housing 250 to facilitate additional coupling schemes. The rear housing 250 is coupled to the operation cord 300 and includes a flanged surface over the recess 240, which may also facilitate coupling schemes.

Figure 3:
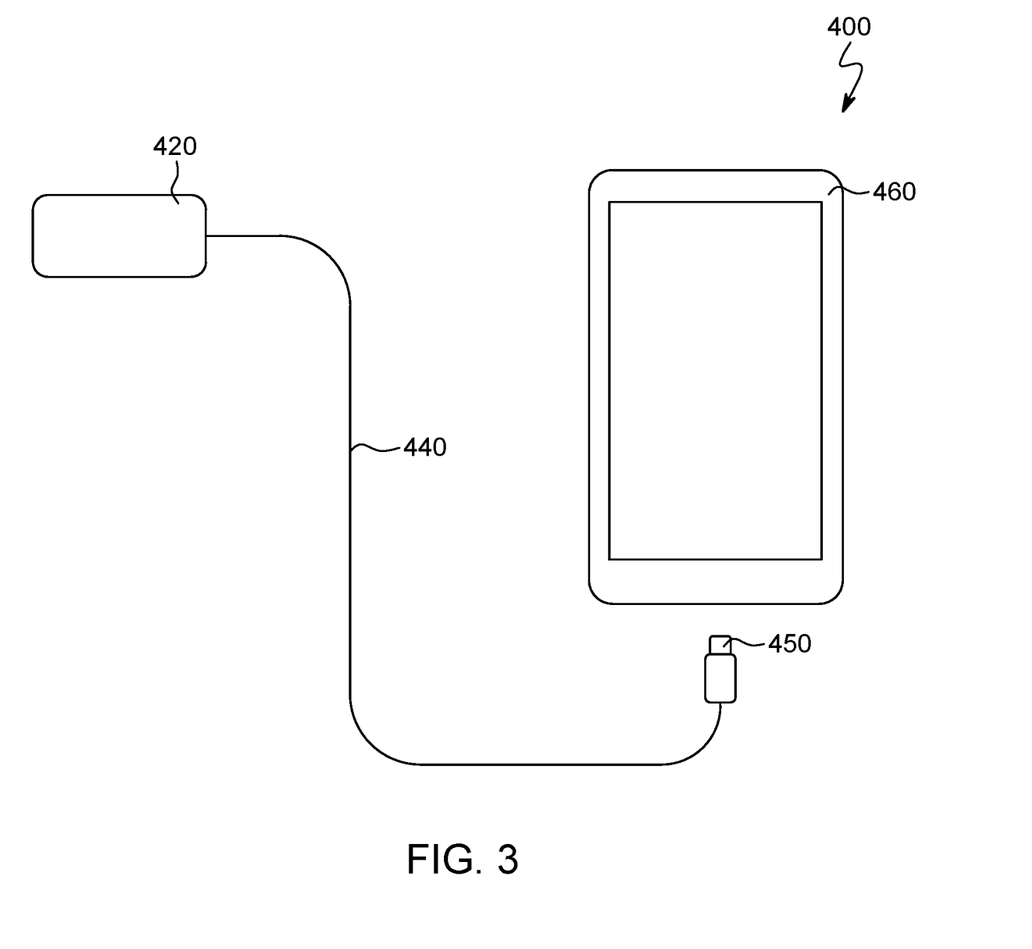
FIG. 3 illustrates a schematic view of a camera system in accordance with embodiments of the present invention.
Figure 4:
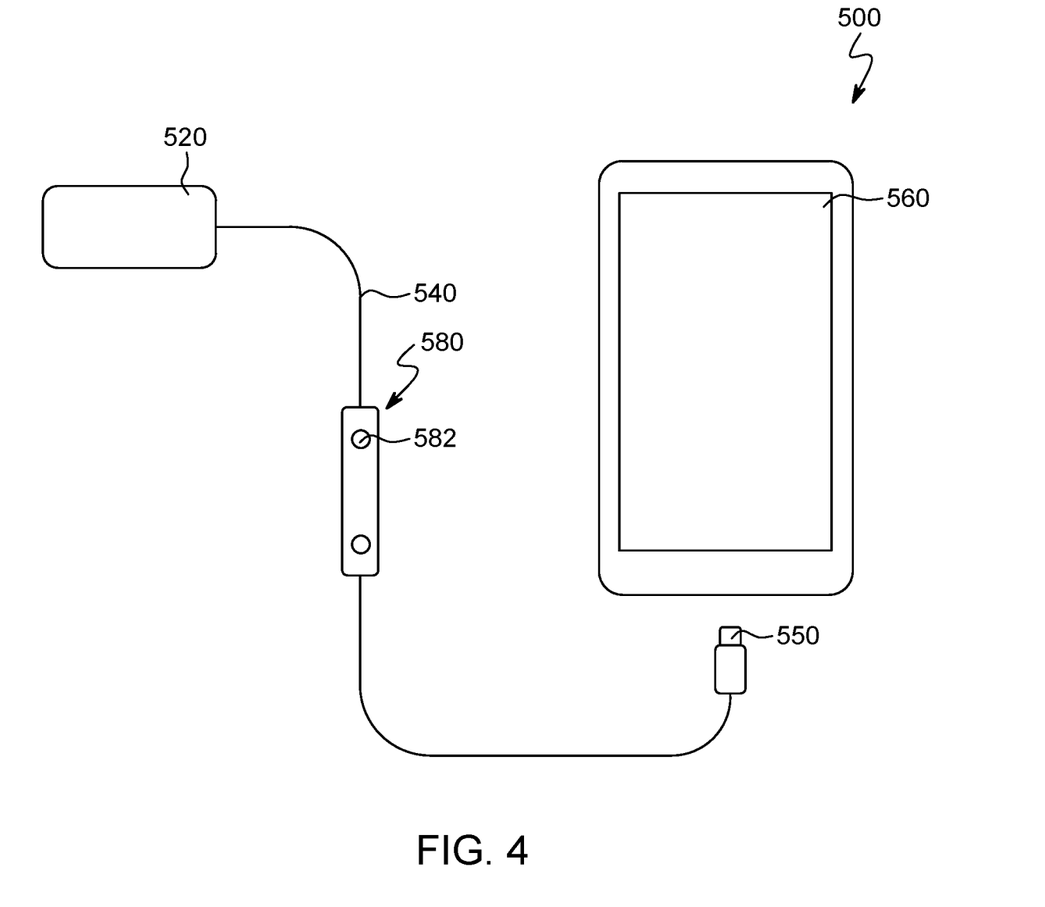
FIG. 4 illustrates a schematic view of a camera system in accordance with an alternative embodiment of the present invention.

Reference is next made to FIGS. 3-4, which illustrate schematic drawings of two alternative camera systems in accordance with embodiments of the present invention, designated generally at 400 and 500 respectively. FIG. 3 illustrates a camera system 400 including a camera 420, operation cord 440, coupler 450, and portable computer device 460. The operation cord 440 transmits both data and electrical power between the camera 420 and the portable computer device 460 as described above, so as to make the camera 420 operationally dependent on the portable computer device 460. The operation cord 440 may be coupled to the portable computer device 460 via a removable electrical coupler 450 such as a LIGHTNING or USB type coupler. FIG. 4 illustrates an alternative camera system 500 including a camera 520, operation cord 540, controller 580, coupler 550, and portable computer device 560. The operation cord 540 transmits both data and electrical power between the camera 520 and the portable computer device 560 as described above, so as to make the camera 520 operationally dependent on the portable computer device 560. The operation cord 540 may be coupled to the portable computer device 560 via a removable electrical coupler 550 such as a LIGHTNING or USB type coupler. The operation cord 540 further includes a controller 580 disposed between the camera 520 and the portable computer device 560. The controller 580 may be configured to control one or more functions of the camera 520 via a user input device 582 such as a button. The controller 580 does not alter the operational dependence between the camera 520 and the portable computer device 560 but rather provides a parallel method for receiving user input to control functional parameters relating to the camera 520. For example, a button user input device on the controller 580 may turn on and off the recording status of the camera 520. The controller 580 may transmit the user input to the portable computer device 560, which then alters the camera 520 parameters relating to on and off recording status.

An alternative embodiment of the present invention relates to a method for activating a portable camera system with a portable computer device. The method may include an act of initially providing a portable computer device (PCD) and an operationally dependent external camera system such as the one illustrated and described above. A user may then orient the camera toward the desired field of view for either a photograph or video. The user may then physically connect the camera system to the PCD via an operation cable. The operation cable transmits both electrical power and data between the camera system and the PCD. The camera may be configured to automatically activate upon coupling the operation cable. Alternatively, the user may control the activation of the camera system via optional physical controls on the camera body or by using a software application interface on the PCD (i.e. app). The operation cord may also be optionally configured to provide a visual display corresponding to the activation status of the camera system. For example, if the camera system is on, the operation cord may be configured to display a green light along the lengthwise portion between the PCD and the camera system. The novel display on the operation cord is particularly useful in that the camera body is likely positioned and oriented outside of the visual field of view of the user. Likewise, the PCD may also be stored in the user's pocket and/or may be used to display other information. Therefore, the ability to visually confirm the activation of the camera system via the physical operation cord is useful in various video recording scenarios. The method may optionally include releasably coupling the camera system to an external location on the user. The act of releasable coupling may include engaging a clasp mechanism on the body, recess, or flange of the camera system in a manner to reliably couple the camera body to the specific location. For example, a clasp may include a C-clamp around the camera recess attached to a clip, which may be opened and coupled to the collar of a shirt, so as to position the camera lens at a particular viewing angle.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. An operationally dependent external camera system including a portable computer device comprising:
    a portable computer device including at least one of a smartphone, tablet or tablet phone having a total volume smaller than twenty cubic inches;
    a camera having an outer dimension smaller than three cubic inches, wherein the camera further includes a plurality of functional parameters that correspond to all variable functions of the camera including but not limited to resolution and recording status; and
    an operation cord coupled between the camera and the portable computer device configured to continuously transmit both data and electrical power directly between the portable computer device and the camera;
    wherein the data transmitted directly between the camera and portable computer device correspond to the camera functional parameters causing the camera to be operationally dependent on the portable computer device for directly adjusting all variable functions of the camera,
    wherein the camera includes a lens, image sensor, circuit board, microphone, and control unit, and
    wherein the operation cord includes a controller with at least one user input device configured to indirectly affect at least one of the functional parameters of the camera, wherein the controller indirectly affects at least one of the functional parameters of the camera by transmitting data to the portable computer device which then transmits data directly to the camera.

2. The system of claim 1, wherein the controller includes a button user input device configured to affect a functional parameter of the camera corresponding to recording on/off status.

3. The system of claim 1, wherein the functional parameters include audio on/off, three dimensional position, volume, brightness, and image capture.

4. The system of claim 1, wherein the electrical power transmitted from the portable computer device to the camera via the operation cord provides all electrical power to the camera.

5. The system of claim 1, wherein the camera includes a releasable coupling member configured to selectively retain the camera on an external user location during operation.

6. An operationally dependent external camera system including a portable computer device comprising:
    a portable computer device including at least one of a smartphone, tablet or tablet phone having a total volume smaller than twenty cubic inches;
    a camera having an outer dimension smaller than three cubic inches, wherein the camera further includes a plurality of functional parameters that correspond to all variable functions of the camera including but not limited to resolution and recording status; and
    an operation cord coupled between the camera and the portable computer device configured to continuously transmit both data and electrical power directly between the portable computer device and the camera;
    wherein the data transmitted directly between the camera and portable computer device correspond to the camera functional parameters causing the camera to be operationally dependent on the portable computer device for directly adjusting all variable functions of the camera,
    wherein the camera includes a lens, image sensor, circuit board, microphone, and control unit,
    wherein the operation cord is coupled to the camera at an end opposite to the lens, and
    wherein the camera includes a coupling recess disposed between the operation cord and the lens, wherein the coupling recess is at least one of a lengthwise detent and a radial concave region.

7. The system of claim 1, wherein the portable computer device includes an application configured to receive a plurality of user inputs corresponding to the functional parameters of the camera, and wherein the application converts the received user inputs into instructions transmitted to the camera effecting at least one of the variable functions of the camera.

8. The system of claim 1, wherein the portable computer device includes an application configured to receive data recorded by the camera via the operation cord.

\* \* \* \* \*